(12) United States Patent
Eilers et al.

(10) Patent No.: US 10,221,963 B2
(45) Date of Patent: Mar. 5, 2019

(54) BALL VALVE WITH MODAL SILENCER

(71) Applicant: FISHER CONTROLS INTERNATIONAL LLC, Marshalltown, IA (US)

(72) Inventors: Daniel J. Eilers, Marshalltown, IA (US); Allen C. Fagerlund, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 9 days.

(21) Appl. No.: 15/445,294

(22) Filed: Feb. 28, 2017

(65) Prior Publication Data
US 2018/0245713 A1 Aug. 30, 2018

(51) Int. Cl.
*F16K 47/02* (2006.01)
*F16K 5/06* (2006.01)
*F16K 47/04* (2006.01)

(52) U.S. Cl.
CPC ............... *F16K 47/02* (2013.01); *F16K 5/06* (2013.01); *F16K 5/0605* (2013.01); *F16K 5/0657* (2013.01); *F16K 47/045* (2013.01)

(58) Field of Classification Search
CPC ........ F16K 47/02; F16K 47/14; F16K 47/045; F16K 5/06; Y10T 137/86751; F01N 1/026; F16L 55/0338; F16L 55/02781; F02M 35/1266
USPC ...................... 137/625.32; 251/127; 181/226
See application file for complete search history.

(56) References Cited

U.S. PATENT DOCUMENTS

| 4,091,892 A * | 5/1978 | Hehmann | F02K 1/827 181/212 |
| 4,212,321 A * | 7/1980 | Hulsey | F16K 5/0615 137/625.32 |
| 4,479,510 A * | 10/1984 | Bey | F16K 5/10 137/625.31 |
| 5,287,889 A * | 2/1994 | Leinen | F16K 5/0605 137/625.3 |
| 5,332,004 A | 7/1994 | Gethmann et al. | |
| 5,400,825 A * | 3/1995 | Gethmann | F16K 5/0605 137/625.32 |
| 5,758,689 A * | 6/1998 | Leinen | F16K 47/045 137/625.32 |
| 5,937,901 A * | 8/1999 | Bey | F16K 47/045 137/625.32 |

(Continued)

OTHER PUBLICATIONS

Broukhiyan, "The Modal Coincidence Suppresion Device (MCSD) for the Reduction of Noise from Control Valves;" 1983.

(Continued)

*Primary Examiner* — Matthew W Jellett
(74) *Attorney, Agent, or Firm* — Marshall, Gerstein & Borun LLP

(57) ABSTRACT

A ball valve may include a control element including a perforated screen disposed within the control element and spaced apart from an inner surface of the control element to form an annular space and a plurality of chambers disposed within the control element. When fluid flows through the control element, sound waves pass through the perforated screen and are reflected back by the plurality of chambers to disrupt other sound waves, thereby reducing fluid noise in the rotary valve.

14 Claims, 2 Drawing Sheets

(56) References Cited

U.S. PATENT DOCUMENTS

| | | | | |
|---|---|---|---|---|
| 6,029,702 A | * | 2/2000 | Leinen | F16K 5/0605 |
| | | | | 137/625.32 |
| 7,044,436 B2 | * | 5/2006 | Corbetta | F16K 47/045 |
| | | | | 137/625.31 |
| 7,117,894 B2 | * | 10/2006 | Zuccarelli | F16K 47/045 |
| | | | | 137/625.32 |
| 7,156,122 B2 | * | 1/2007 | Christenson | F16K 5/0605 |
| | | | | 137/625.32 |
| 7,934,581 B2 | * | 5/2011 | Kim | F04D 29/665 |
| | | | | 123/184.53 |
| 8,366,070 B2 | * | 2/2013 | Rimboym | F16K 5/0605 |
| | | | | 137/625.31 |
| 8,931,591 B2 | * | 1/2015 | Fagerlund | F16L 55/0336 |
| | | | | 181/233 |
| 9,376,946 B1 | | 6/2016 | Eliers et al. | |
| 2014/0090922 A1 | * | 4/2014 | Fagerlund | F16L 55/0336 |
| | | | | 181/207 |
| 2015/0102251 A1 | | 4/2015 | Dalluge | |

OTHER PUBLICATIONS

Search Report for International application No. PCT/US2018/018583, dated May 24, 2018.
Written Opinion for International application No. PCT/US2018/018583, dated May 24, 2018.

\* cited by examiner

BALL VALVE WITH MODAL SILENCER

BACKGROUND

Field of the Disclosure

The invention generally relates to noise reduction devices for control valves and regulators and more specifically to a ball valve having a ball element that includes a modal silencer.

Related Technology

Fluid valves control the flow of fluid from one location to another. When the fluid valve is in a closed position, high pressure fluid on one side is prevented from flowing to a lower pressure location on the other side of the valve. The pressure differences between an inlet and an outlet of the control valve, along with a tortuous flow path through the control valve, produce turbulent fluid flow downstream of the control valve, which causes unwanted and potentially harmful noise.

In an attempt to reduce noise, multi-port cages or trims have been used in some regulators to reduce the pressure drop across the cage and to smooth downstream flow. However, these cage-type noise reducers also reduce fluid flow rates through the cage, which may reduce efficiency of the regulator.

Other types of sound reducing devices include materials disposed in the flow path that absorb sound waves and convert the sound waves to heat energy. However, such sound absorbing materials have limited effective frequencies and they also reduce fluid flow through the material.

Recently some attempts have been made to reduce noise with attenuation devices located downstream of the regulator. In particular, a modal coincidence suppression device is described in "The Modal Coincidence Suppression Device (MCSD) For The Reduction Of Noise From Control Valves" by Ali E. Broukhiyan, hereinafter ("MCSD") which is hereby incorporated by reference herein. However, the modal suppression device disclosed in MCSD was very heavy and was difficult to assemble. Additionally, the modal suppression device was located downstream of the valve, which left the valve components exposed to the effects of the noise generated by the valve.

SUMMARY OF THE DISCLOSURE

In accordance with one exemplary aspect of the present invention, a ball valve may include a valve body having a fluid inlet and a fluid outlet connected by a fluid flowpath. A control element is disposed in the fluid flowpath, and the control element controls fluid flow through the valve body. A perforated screen is disposed within the control element and spaced apart from an interior surface of the control element to form an annular space. A plurality of chambers is formed in the control element. Sound waves pass through the perforated screen and are reflected back by the plurality of chambers to disrupt other sound waves, thereby reducing noise in the control element.

In accordance with another exemplary aspect of the present invention, a method of reducing noise from fluid flowing through a ball valve may include arranging a plurality of annular chambers within control element of a ball valve, arranging a perforated screen within the control element, a distance between the perforated screen and an inner surface of the chambers in the plurality of chambers defining an annular space; and arranging opposing chambers in the plurality of chambers at a distance that corresponds to disruption of a particular frequency of sound wave.

In further accordance with any one or more of the foregoing aspects, a ball valve (or a method of reducing noise from fluid flowing through a ball valve) may further include any one or more of the following preferred forms.

In some preferred forms, the plurality of chambers are formed by a plurality of walls disposed on an inner surface of the control element, the plurality of walls extending substantially perpendicular to a direction of fluid flow through the control element. The plurality of walls defines the plurality of chambers between the perforated screen and the inner surface of the control element.

In yet other preferred forms, at least two chambers in the plurality of chambers differ in volume.

In yet other preferred forms, the chambers increase in volume from an inlet portion of the control element towards a center of the control element.

In yet other preferred forms, the chambers decrease in volume from the center of the control element towards an outlet portion of the control element.

In yet other preferred forms, the plurality of chambers approximate a curve when viewed in cross-section.

In yet other preferred forms, the perforated screen includes a plurality of perforations, and in other preferred forms, at least one perforation in the plurality of perforations is circular in shape.

In yet other preferred forms, the perforated screen has an inner diameter that is substantially the same as an inner diameter of the inlet portion of the control element and of the outlet portion of the control element.

In yet other preferred forms, a perforated plate is disposed within the control element, the perforated plate extending substantially perpendicular to a direction of fluid flow through the control element.

In yet other preferred forms, a distance between opposite chambers corresponds to disruption of a particular frequency of sound wave.

DETAILED DESCRIPTION

The ball valves described herein advantageously provide noise reduction within control valves while having very little flow restriction. Thus, the disclosed ball valves are highly efficient in reducing noise. The disclosed ball elements may be significantly smaller and/or lighter than current ball elements with noise reduction devices. Thus, the disclosed ball valves may have smaller valve bodies that current ball valves.

Additionally, a perforated tube in the disclosed ball valves may be customized for particular uses by adjusting the transmission index of the perforated tube. Moreover, the disclosed ball valves may be combined with more traditional noise suppression devices, such as noise reducing trims, to achieve a more comprehensive noise reduction.

Generally speaking, the ball valves described herein reduce noise in a fluid flowing through a valve by using sound wave interference to destroy or reduce the amplitude of sound waves in the valve. The disclosed ball valves use a series of different sized or shaped gaps, which are created by internal plates or by internal chambers in distinct patterns. The overall length and/or spacing of the gaps may be optimized for a particular gas or flow configuration to target specific sound wave frequencies.

Unless specified otherwise, any of the features or characteristics of any one of the embodiments of the ball valves disclosed herein may be combined with the features or characteristics of any of the other embodiments of ball valves.

Figure 1:
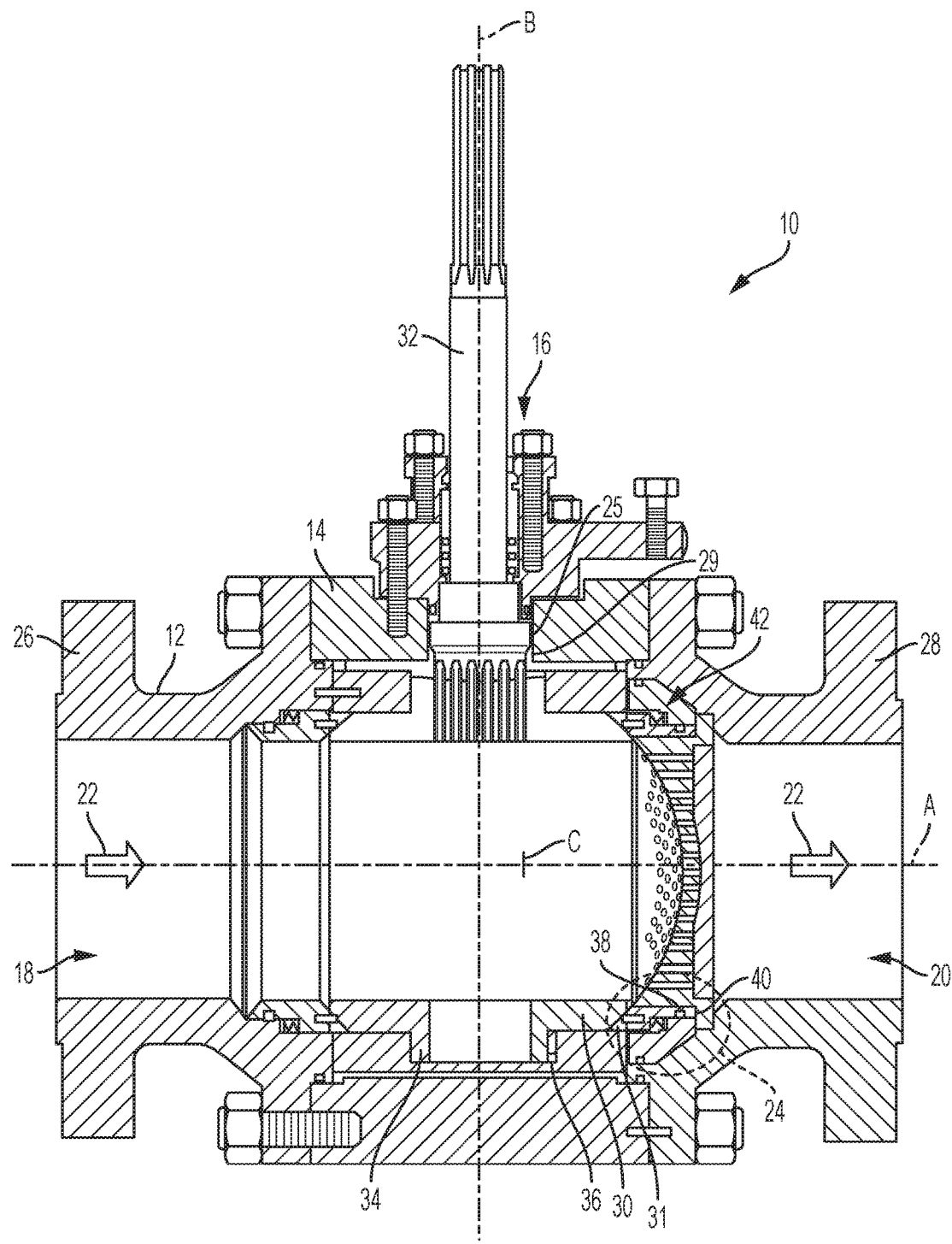
FIG. 1 is a side cross-sectional view of a ball valve having a modal silencer.

FIG. 1 illustrates a rotary ball valve 10 constructed in accordance with the principles of the disclosure, the rotary ball valve 10 generally includes a valve body 12, a bonnet 14, a control assembly 16, and a seal assembly 24. The valve body 12 includes an inlet 18, an outlet 20, a fluid flowpath 22, and a bonnet opening 25. As indicated by the arrow, the fluid flowpath 22 extends from the inlet 18 to the outlet 20 in a direction that is generally parallel to a longitudinal axis A. The inlet 18 is surrounded by an inlet flange 26. The outlet 20 is surrounded by an outlet flange 28. The inlet flange 26 and the outlet flange 28 are adapted to couple the ball valve 10 into a process control pipeline such as by bolting, welding, clamping, or any other known means.

The control assembly 16 includes a control element, such as an eccentric cammed ball element 30, a drive shaft 32, and a support shaft 34. While an eccentric cammed ball element 30 is illustrated in FIG. 1, in other embodiments, the ball element 30 may not be eccentrically cammed. In the illustrated embodiment, the drive shaft 32 and the support shaft 34 are separated by a distance. In other embodiments, the drive shaft 32 and the support shaft 34 may be integrally formed as a single piece that extends from a through-bore 29 to a blind bore 36. In the illustrated embodiment, the ball element 30 has an axis of symmetry C that is offset from the drive shaft axis B. As a result, a sealing surface 31 of the ball element 30 rotates moves with a camming action (e.g., the sealing surface 31 displaces longitudinally, along axis A when the ball element 31 rotates between a closed position and an open position).

As discussed above, the ball element 30 typically moves with a camming action to facilitate a repeatable seal with the seal assembly 24 when in the closed position, as shown in FIG. 1. More specifically, the exterior or sealing surface 31 of the ball element 30 may define a portion of a sphere, all points on the exterior surface of the ball element not being equidistant from a natural pivot point (i.e., axis C) of the ball element 30.

To accommodate the seal assembly 24, the disclosed embodiment of the valve body 12 includes an internal recess 42 disposed downstream from the inlet 18. The internal recess 42 is disposed between the outlet 20 and the ball element 30 of the control assembly 16. The internal recess 42 may have a generally annular shape including an annular surface 38 and a transverse surface 40.

The ball valve 10 may also include an optional trim element, such as a perforated cage. In other embodiments, the trim element may be eliminated.

Figure 2:
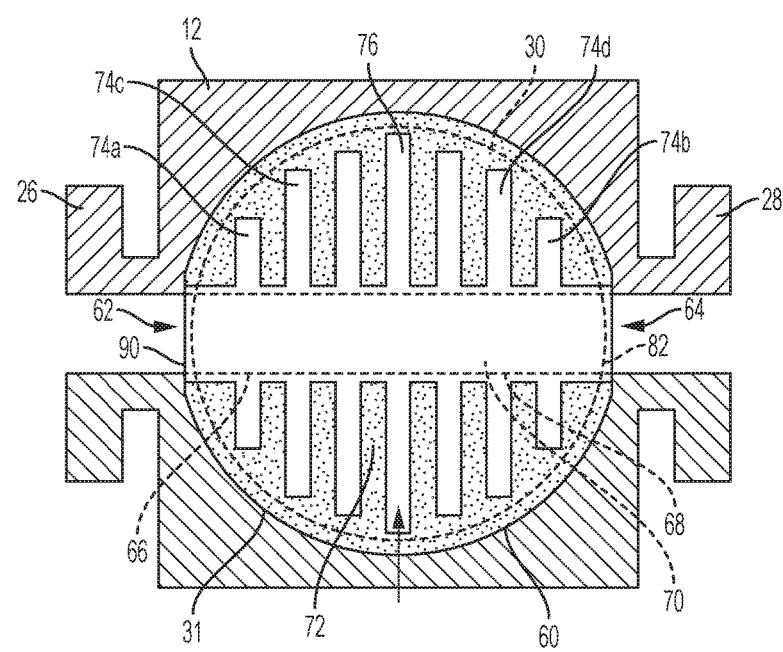
FIG. 2 is a top cross-sectional view of the ball valve of FIG. 1.

Turning now to FIG. 2, one exemplary embodiment of a ball element 30 includes a ball body 60. The ball body 60 may include an inlet portion 62 connected and an outlet portion 64. The inlet portion 62 and the outlet portion 64 may be substantially cylindrical in shape with a substantially constant inner diameter.

A perforated hollow screen 66 may be located within the ball body 60, and the screen 66 may have an inner diameter that is substantially the same as the inner diameter of the inlet portion 62 and/or the outlet portion 64. The screen 66 may have a cylindrical screen body 68 including a plurality of perforations 70. In one exemplary embodiment, at least one of the perforations 70 may be circular in shape. In other embodiments, the perforations 70 may take on other shapes, such as, for example, square, rectangular, triangular, polygonal, oval, or irregular. In other embodiments, the screen body 68 may be fully or partially coated with a sound absorbing material.

A plurality of walls 72 may be disposed on an inner surface of the ball body 60. The walls 72 divide a space between the inner surface of the ball body 60 and an outer surface of the screen body 68 into a plurality of chambers 74. At least two of the chambers 74 define different volumes. In the embodiment of FIG. 2, a volume of the chambers 74 increases from the inlet portion 62 towards a center of the ball body 60. On the other hand, a volume of the chambers 74 decreases from the center of the ball body 60 towards the outlet portion 64. The walls 72 and chambers 74 are arranged to reflect sound waves in the fluid moving through the ball element 30 back towards an interior of the screen body 68, which results in disruption or cancellation of the sound waves as they collide with other sound waves in the interior of the screen body 68. The openings 70 allow the sound waves to propagate back and forth between the interior of the screen body 68 and the chambers 74. By controlling the volume and width of the chambers 74, along with a distance between opposing chambers 74, certain frequencies of sound waves may be targeted for disruption. Each chamber 74 defines an annular space 76 between the screen body 68 and the ball body 60. Each annular space 76 has a width and a height. Widths and heights may vary from chamber 74 to chamber 74.

The perforated screen 66 and the chambers 74 define a modal silencer.

As illustrated in FIG. 2, a change in volume of adjacent chambers 74 may approximate a curve, which in the illustrated embodiment is a portion of a circle 82 (illustrated as a dashed circle in FIG. 2). The curve may be defined by a mathematical formula for a circle or an ellipse. The curve may be adjusted to target specific sound wave frequencies, and thus be customized for any particular application.

In some embodiments, the ball body 60 may include a pre-attenuation device in the form of a perforated plate 90. The perforated plate 90 may extend across the inside of the ball body 60, substantially perpendicular to the direction of fluid flow, which is illustrated by arrows in FIG. 1. In one embodiment, the perforated plate 90 may include a plurality of perforations, which disrupt sound waves in the fluid flowing through the ball body 60. The perforated plate 90 may target different frequencies of noise than the chambers 74. In some embodiments, the perforated plate 90 may be partially or fully coated with a sound absorbing material. Additionally, the perforated plate 90 may characterize fluid flow prior to reaching the screen body 68 so that the noise reduction properties of the remainder of the ball body 60 can be optimized.

A first distance between a first chamber 74a and a second chamber 74b may be calculated to correspond to a disruption of a first frequency of noise and a second distance between a third chamber 74c and a fourth chamber 74d may be calculated to correspond to a disruption of a second frequency of noise. By designing the annular space to different distances that correspond to different frequencies of noise, the ball element 30 may be adapted to target specific frequencies of noise that are present in particular operational environments.

A method of reducing noise in fluid flowing through a ball valve may include manufacturing and designing any of the above disclosed embodiments of a ball valve control element and installing the ball valve in a process system. More specifically, the method may include arranging a plurality of annular chambers within the control element, arranging a perforated screen within the control element so that a distance between the perforated screen and an inner surface of the control element defines an annular space, and arranging opposing chambers in the plurality of chambers at a distance that corresponds to disruption of a particular frequency of sound wave.

In other embodiments, the rotary valves and ball elements described herein may be customized for particular uses by making plates made of different materials or by coating/finishing the plates in different ways or with different materials to change the way sound waves are reflected in the control element. Mixing plates and/or coatings effectively creates one or more sound lenses that direct sound waves in particular ways to improve sound wave destruction and/or to target particular frequencies.

Although certain ball valves and control elements have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A ball valve with a modal silencer for reducing noise, the ball valve comprising:
   a valve body having a fluid inlet and a fluid outlet connected by a fluid flowpath;
   a control element disposed in the fluid flowpath, the control element having a control element body and a bore between an inlet portion and an outlet portion, the control element controlling fluid flow through the valve body;
   a perforated screen disposed within the control element and spaced apart from an interior surface of the control element to form an annular space, the perforated screen including a screen body; and
   a plurality of chambers formed in the control element, the plurality of chambers being formed by a plurality of walls extending substantially perpendicular to a direction of fluid flow through the control element, the plurality of walls extending from an inner surface of the control element body, the plurality of chambers each defining an annular space between the screen body and the control element body;
   wherein sound waves pass through the perforated screen and are reflected back by the plurality of chambers to disrupt other sound waves, thereby reducing noise in the control element.

2. The ball valve of claim 1, wherein at least two chambers in the plurality of chambers differ in volume.

3. The ball valve of claim 2, wherein the at least two chambers increase in volume from an inlet portion of the control element towards a center of the control element.

4. The ball valve of claim 2, wherein the at least two chambers decrease in volume from the center of the control element towards an outlet portion of the control element.

5. The ball valve of claim 2, wherein the plurality of chambers approximate a circle when viewed in cross-section.

6. The ball valve of claim 1, wherein the perforated screen includes a plurality of perforations.

7. The ball valve of claim 6, wherein at least one perforation in the plurality of perforations is circular in shape.

8. The ball valve of claim 1, wherein the perforated screen has an inner diameter that is substantially the same as an inner diameter of the inlet portion of the control element and of the outlet portion of the control element.

9. The ball valve of claim 1, further comprising a perforated plate disposed within the control element, the perforated plate extending substantially perpendicular to a direction of fluid flow through the control element.

10. The ball element of claim 1, wherein a distance between opposite chambers corresponds to disruption of a particular frequency of sound wave.

11. A method of reducing noise from fluid flowing through a ball valve, the method comprising:
    arranging a plurality of annular chambers within control element of a ball valve, the control element having a control element body, the plurality of annular chambers being formed by a plurality of walls extending substantially perpendicular to a direction of fluid flow through the control element, and the plurality of walls extending from an inner surface of the control element body;
    arranging a perforated screen within the control element, a distance between the perforated screen and an inner surface of chambers in the plurality of annular chambers defining an annular space; and
    arranging opposing chambers in the plurality of annular chambers at a distance that corresponds to disruption of a particular frequency of sound wave.

12. The method of claim 11, further comprising arranging a perforated plate within the control element, the perforated plate extending substantially perpendicular to a direction of fluid flow through the control element.

13. The method of claim 12, further comprising coating the perforated plate with a first sound absorbing coating.

14. The method of claim 13, further comprising coating the perforated screen with a second sound absorbing coating.

* * * * *

UNITED STATES PATENT AND TRADEMARK OFFICE
CERTIFICATE OF CORRECTION

PATENT NO. : 10,221,963 B2  
APPLICATION NO. : 15/445294  
DATED : March 5, 2019  
INVENTOR(S) : Daniel J. Eilers et al.

Page 1 of 1

It is certified that error appears in the above-identified patent and that said Letters Patent is hereby corrected as shown below:

In the Specification

Column 2, Line 56, "that" should read -- than --.

Column 6, Line 24, "ball element" should read -- ball valve --.

Signed and Sealed this
Seventh Day of July, 2020

Andrei Iancu
*Director of the United States Patent and Trademark Office*